(12) United States Patent
Masuda

(10) Patent No.: US 10,795,004 B2
(45) Date of Patent: Oct. 6, 2020

(54) DISTANCE MEASUREMENT APPARATUS

(71) Applicant: Hitachi-LG Data Storage, Inc., Tokyo (JP)

(72) Inventor: Kozo Masuda, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 329 days.

(21) Appl. No.: 15/981,934

(22) Filed: May 17, 2018

(65) Prior Publication Data

US 2019/0079170 A1  Mar. 14, 2019

(30) Foreign Application Priority Data

Sep. 11, 2017 (JP) ................... 2017-174076

(51) Int. Cl.
| | |
|---|---|
| *G01S 7/486* | (2020.01) |
| *G01S 17/10* | (2020.01) |
| *G01S 17/89* | (2020.01) |
| *H04N 5/351* | (2011.01) |
| *G01S 7/4865* | (2020.01) |
| *G01B 11/02* | (2006.01) |
| *G01S 7/484* | (2006.01) |
| *G01S 7/4863* | (2020.01) |
| *G01S 7/487* | (2006.01) |

(52) U.S. Cl.
CPC .......... *G01S 7/4865* (2013.01); *G01B 11/026* (2013.01); *G01S 7/484* (2013.01); *G01S 7/4863* (2013.01); *G01S 7/4873* (2013.01); *G01S 17/10* (2013.01); *G01S 17/89* (2013.01); *H04N 5/351* (2013.01)

(58) Field of Classification Search
CPC ........ G01S 7/4865; G01S 17/89; G01S 17/10; G01S 7/484; G01S 7/4863; G01S 7/4873; G01B 11/026; H04N 5/351
USPC ........................................ 356/5.01
See application file for complete search history.

(56) References Cited

U.S. PATENT DOCUMENTS 9,784,822 B2 * 10/2017 Metz .................... G01B 11/026
2009/0210193 A1    8/2009 Nagase

FOREIGN PATENT DOCUMENTS

JP    2009-174830 A    8/2009

* cited by examiner

*Primary Examiner* — Daniel L Murphy
(74) *Attorney, Agent, or Firm* — Mattingly & Malur, PC

(57) ABSTRACT

A distance measurement apparatus 1 includes: a TOF camera 10 having a light-emitting unit 11, a light-receiving unit 12, and a distance-calculating unit 13 to measure a distance to the subject on the basis of light transmission time; and an image processing unit 17 that creates a distance image of the subject from distance data measured by the TOF camera 10. The image processing unit 17 determines whether or not there is a detection target in the created distance image. If there is no detection target in the distance image, the light emission intensity control unit 18 decreases the emitted light intensity from the light source of the light-emitting unit 11, and the operation mode is switched to a power saving mode in which the pixel addition control unit 19 increases an addition ratio of a neighboring pixel signal of the light-receiving unit 12.

7 Claims, 9 Drawing Sheets

FIG. 3
(a) SUBJECT IMAGE (A)    (b) BACKGROUND IMAGE (B)
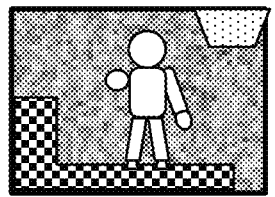  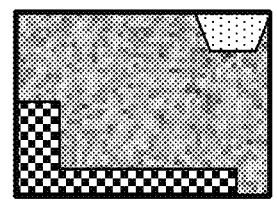
(c) DIFFERENTIAL IMAGE (C=A-B)
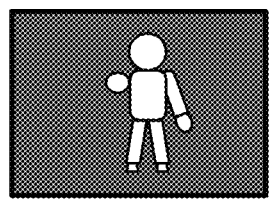

FIG. 4
| | OPERATION MODE | |
|---|---|---|
| | (a) POWER SAVING MODE | (b) HIGH DEFINITION MODE |
| LIGHT-EMITTING UNIT<br><br>LIGHT EMISSION PULSE | NUMBER OF PULSES: SMALL<br>PULSE AMPLITUDE: SMALL<br> | NUMBER OF PULSES: LARGE<br>PULSE AMPLITUDE: LARGE<br> |
| LIGHT-RECEIVING UNIT<br><br>PIXEL ADDITION PROCESS | PIXEL ADDITION RATIO: HIGH<br>(EXAMPLE OF 2x2)<br>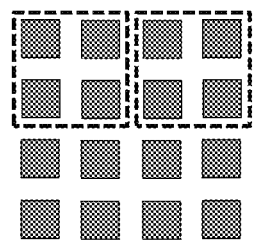 | PIXEL ADDITION RATIO: LOW<br>(EXAMPLE OF 1x1)<br>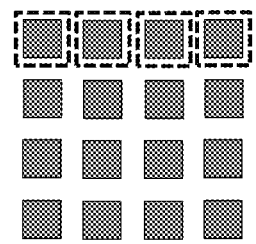 |

FIG. 5
SWITCHING OF OPERATION MODE
"POWER SAVING MODE"
NO PERSON
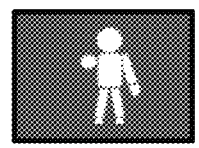
PERSON IS PRESENT
SWITCH TO "HIGH DEFINITION MODE"
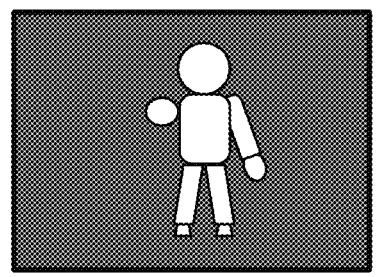

F I G. 9
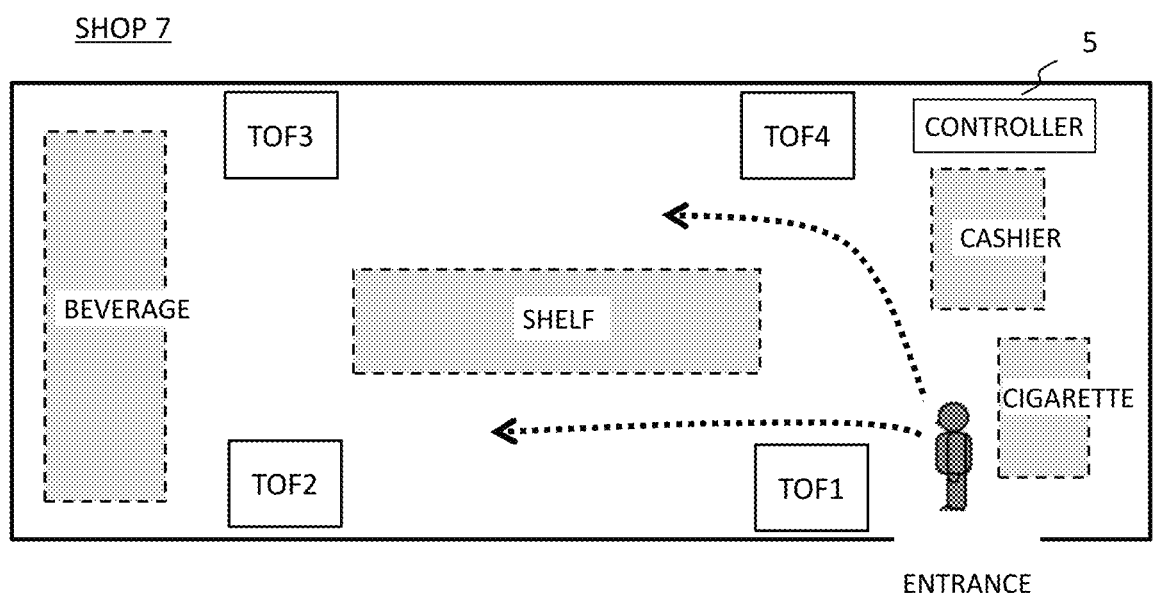

DISTANCE MEASUREMENT APPARATUS

CLAIM OF PRIORITY

The present application claims priority from Japanese patent application serial No. JP 2017-174076, filed on Sep. 11, 2017, the content of which is hereby incorporated by reference into this application.

BACKGROUND OF THE INVENTION

(1) Field of the Invention

The present invention relates to a distance measurement apparatus that outputs a distance to a subject as a distance image.

(2) Description of the Related Art

There is known a technique of measuring a distance to an object on the basis of light transmission time (hereinafter, referred to as a time of flight (TOF) method) and outputting the distance as a displayed image (distance image). For example, JP 2009-174830 A discusses a person location detection device having a distance displacement detection means that detects a distance or displacement to an object in an indoor space on the basis of distance information from a TOF type distance image sensor, and a person determination means that determines whether or not the detected object is a person by specifying a shape of the detected distance displacement area. In this technique, a direction and a distance to the distance displacement area whose shape is specified as a person are detected as a person location.

SUMMARY OF THE INVENTION

In the technique discussed in JP 2009-174830 A, a distance to an object in an indoor space is measured, and a distance displacement area is detected from a time change rate of the measurement value. In addition, whether or not the detected object is a person is determined by comparing a characteristic of a person shape registered in advance with a characteristic of the detected distance displacement area.

In the TOF-based distance measurement, pulse light is irradiated onto a subject from a laser light source or the like, and the pulse light reflected from the subject is received, so that a distance to the subject is calculated on the basis of a time difference therebetween. In this case, the light intensity emitted from the light source is constant. In particular, in a measurement system provided with a plurality of distance measurement apparatuses in the same room such as a shop, a total power consumption of the light sources increases. For example, when a measurement target is set to a person, but there is no person as the measurement target in the room, a part of the power is uselessly consumed because the emitted light intensity is constant.

Meanwhile, if the emitted light intensity of the light source is reduced in order to reduce the power consumption, an intensity of reflection light from a subject decreases, so that it is difficult to perform a stable distance measurement operation. The techniques of the related art including JP 2009-174830 A do not particularly consider reduction of power consumption of the light source and distance measurement performance.

An object of the invention is to provide a distance measurement apparatus capable of reducing power consumption of the light source and securing distance measurement performance.

According to an aspect of the invention, there is provided a distance measurement apparatus that measures a distance to a subject to output a distance image, the apparatus including: a distance measurement unit having a light-emitting unit, a light-receiving unit, and a distance-calculating unit to measure a distance to the subject on the basis of light transmission time; an image processing unit that creates a distance image of the subject from distance data measured by the distance measurement unit; a light emission intensity control unit that controls an emitted light intensity from a light source of the light-emitting unit; and a pixel addition control unit that controls an addition process for a pixel signal from a neighboring pixel in the light-receiving unit. The image processing unit determines whether or not there is a detection target in the created distance image. A high definition mode, in which the light emission intensity control unit increases the emitted light intensity of the light-emitting unit, and the pixel addition control unit decreases an addition ratio of the neighboring pixel signal of the light-receiving unit, is set if there is the detection target in the distance image. In addition, a power saving mode, in which the light emission intensity control unit decreases the emitted light intensity of the light-emitting unit, and the pixel addition control unit increases the addition ratio of the neighboring pixel signal of the light-receiving unit, is set if there is no detection target in the distance image.

According to an aspect of the invention, it is possible to provide a distance measurement apparatus capable of reducing power consumption of the light source and securing distance measurement performance.

BRIEF DESCRIPTION OF THE DRAWINGS

These and other features, objects and advantages of the present invention will become more apparent from the following description when taken in conjunction with the accompanying drawings wherein:

FIG. 3 is a diagram illustrating creation of a differential image using a differentiator;

FIG. 4 is a diagram illustrating operation states of a light-emitting unit and a light-receiving unit;

FIG. 5 is a diagram illustrating switching of the operation mode depending on a situation of the subject;

FIG. 9 is a diagram illustrating an example of the distance measurement system applied to a shop.

DETAILED DESCRIPTION OF THE EMBODIMENT

Embodiments of the invention will now be described with reference to the accompanying drawings. In the following embodiments, it is assumed that a person is detected as a subject.

First Embodiment

Figure 1:
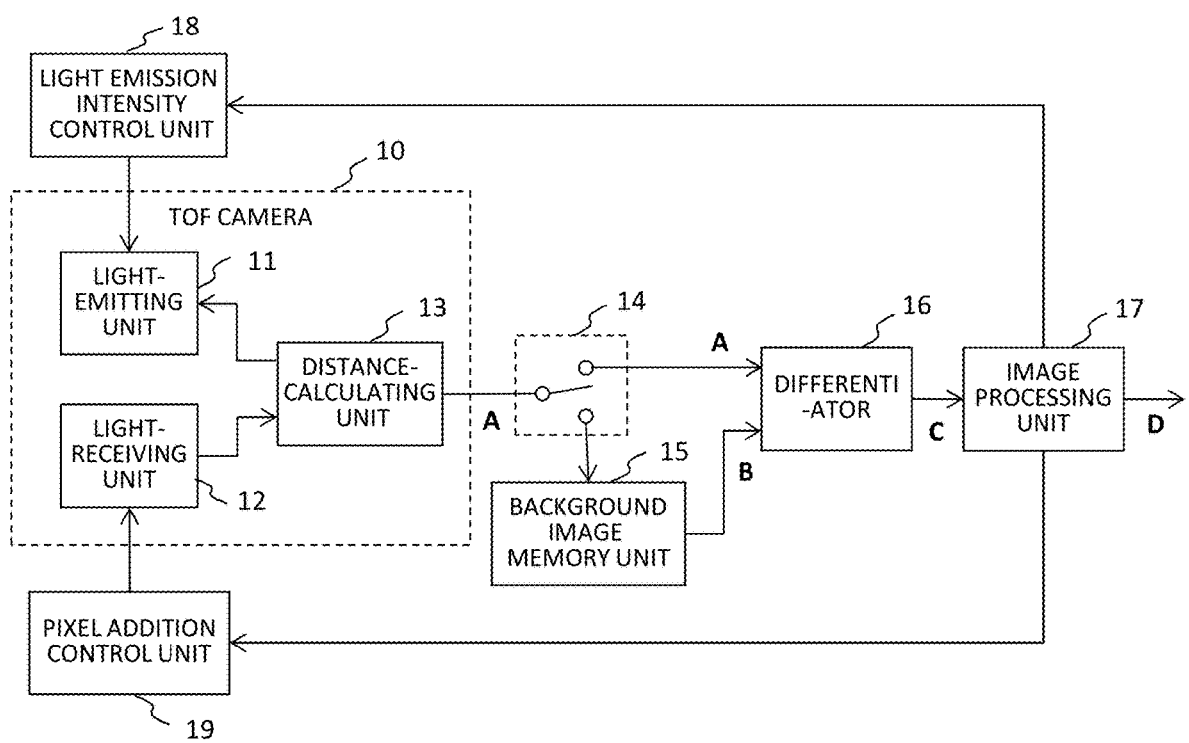
FIG. 1 is a block diagram illustrating a distance measurement apparatus according to a first embodiment.

FIG. 1 is a block diagram illustrating a distance measurement apparatus according to a first embodiment. In the distance measurement apparatus 1, a three-dimensional distance to a subject such as a person is measured on the basis of a time of flight (TOF) method, and the measured distance to each part of the subject is displayed, for example, with color and is output as a two-dimensional distance image. In this case, a background image except for a person is removed from the entire subject, so that a position or posture of the person as a detection target is displayed in an easily visually recognizable manner.

The distance measurement apparatus 1 has a distance measurement unit 10 (hereinafter, referred to as a "TOF camera") that measures a distance to a subject on the basis of the TOF method and outputs a subject image A (three-dimensional distance data), a background image import unit 14 that imports a subject image B (hereinafter, referred to as a background image B), in which no person as a detection target exists in the subject, from the TOF camera 10, a background image memory unit 15 that stores the background image, a differentiator 16 that creates a differential image C by removing the background image B from the subject image A and extracting an object such as a person, and an image processing unit 17 that performs a colorization process for changing hue on the basis of the distance data to each position of the differential image and outputs a distance image D.

The distance measurement unit (TOF camera) 10 has a light-emitting unit 11 provided with a laser diode (LD), a light-emitting diode (LED), or the like to irradiate pulse light to a subject, a light-receiving unit 12 provided with a charge-coupled device (CCD) sensor, a complementary metal oxide semiconductor (CMOS) sensor, or the like to receive the pulse light reflected from the subject, and a distance-calculating unit 13 that drives the light-emitting unit 11 and calculates a distance to the subject on the basis of a detection signal of the light-receiving unit 12. The light-receiving unit 12 photographs a two-dimensional image of a subject. The distance-calculating unit 13 outputs distance data, that is, three-dimensional distance data of the two-dimensional subject image. A principle of the TOF-based distance measurement will be described below.

The light emission intensity control unit 18 controls the emitted light intensity of the light-emitting unit 11, and the pixel addition control unit 19 controls a pixel signal addition process of the light-receiving unit 12. The light emission intensity control unit 18 and the pixel addition control unit 19 switches a control state (operation mode) depending on a subject (person) situation in the distance image D obtained by the image processing unit 17. Note that the operations of each part are controlled by a central processing unit (CPU) (not shown).

Figure 2A:
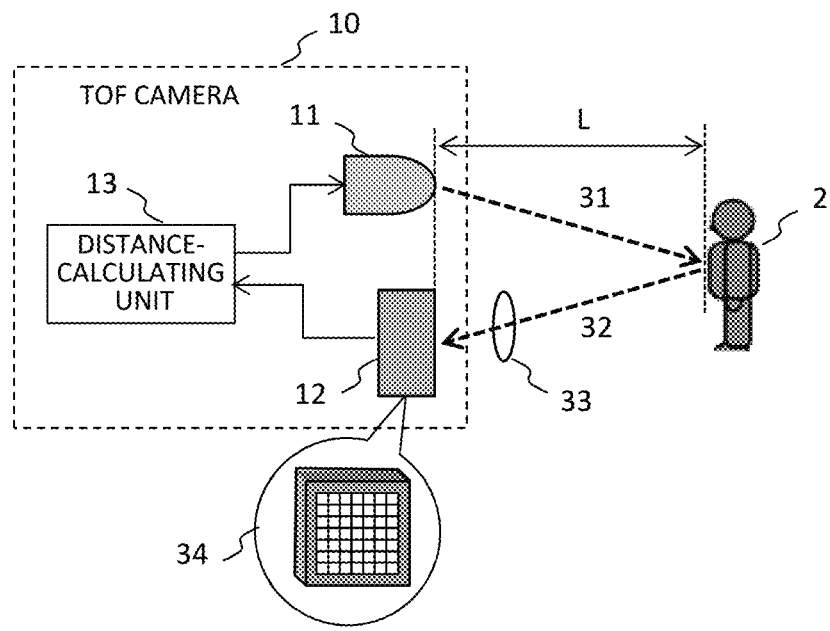
FIG. 2A is a diagram illustrating a principle of TOF-based distance measurement.
Figure 2B:
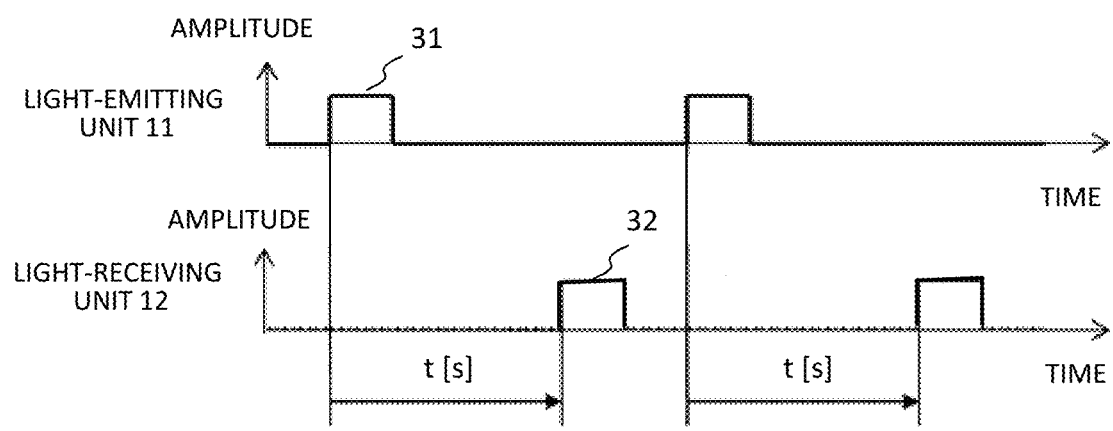
FIG. 2B is a diagram illustrating a principle of TOF-based distance measurement.

FIGS. 2A and 2B are diagrams illustrating the TOF-based distance measurement principle. In the TOF method, a distance is calculated on the basis of a time difference between the emitted light signal and the received light signal, that is, light transmission time.

FIG. 2A is a diagram illustrating a relationship between the TOF camera 10 and the subject 2 (such as a person). The TOF camera 10 has the light-emitting unit 11 and the light-receiving unit 12 and emits distance measurement light 31 from the light-emitting unit 11 to the subject 2. Infrared (IR) light is employed as the emitted light. The light-receiving unit 12 receives reflection light 32 of the light emitted to the subject 2 using a two-dimensional sensor (two-dimensional pixel) 34 such as a CCD through an objective lens 33. The subject 2 is placed in a distance of L [m] far from the light-emitting unit 11 and the light-receiving unit 12. Here, the distance L [m] to the subject 2 is obtained on the basis of Formula (1):

$$L[m]=c[m/s] \times t[s]/2 \qquad (1),$$

where "c[m/s]" denotes a velocity of light, and "t[s]" denotes a time difference (transmission time) until the light-receiving unit 12 receives the reflection light from the start of light emission of the light-emitting unit 11.

FIG. 2B is a diagram illustrating measurement of the time difference t. The distance-calculating unit 13 measures a time difference t between the timing of the light 31 emitted from the light-emitting unit 11 and the timing at which the light-receiving unit 12 receives the reflection light 32, and calculates a distance L from the subject 2 on the basis of Formula (1). In addition, a distance difference at each position of the subject, that is, unevenness of the subject can be obtained from a variation of the light-receiving timing at each pixel position of the two-dimensional sensor 34.

FIG. 3 is a diagram illustrating creation of a differential image using the differentiator 16. The diagram (a) of FIG. 3 illustrates an example of the subject image A obtained from the TOF camera 10, including a detection target person and other objects. The diagram (b) of FIG. 3 illustrates an example of the background image B where no detection target person exists in the subject. For example, in the case of a shop, the background image B is captured and stored while no customer exists before opening. The diagram (c) of FIG. 3 illustrates a differential image C obtained by removing the background image B from the subject image A using the differentiator 16. Through the differentiation process, objects other than a person or background unevenness are removed, and only a person is extracted on the image. However, due to electronic noise generated from the CCD sensor of the light-receiving unit 12 or the like, noise may be superimposed on the differential image C in some cases. In this case, a thresholding process may be applied, in which a signal having a level lower than a predetermined threshold value is regarded as no signal (infinitely far distance).

According to the first embodiment, the operation modes of the light-emitting unit 11 and the light-receiving unit 12 are switched depending on a situation of a subject (person) in the distance image. That is, the operation mode is switched between a power saving operation mode and a high definition operation mode depending on whether or not a detection target person exists in the distance image D obtained by the image processing unit 17. Specifically, a control signal is transmitted from the image processing unit 17 to the light emission intensity control unit 18 and the pixel addition control unit 19. In addition, the light emission intensity control unit 18 adjusts the emitted light intensity of the light-emitting unit 11, and the pixel addition control unit 19 switches the pixel addition process of the light-receiving unit 12.

FIG. 4 is a diagram illustrating operation states of the light-emitting unit 11 and the light-receiving unit 12. The operation mode includes (a) power saving mode and (b) high definition mode. In the (a) power saving mode, the light-emitting unit 11 reduces the number of light emission pulses per unit time or reduces the pulse amplitude in order to suppress power consumption of the light source. The light-receiving unit 12 secures a signal level necessary for the distance measurement by adding electrons generated from a plurality of neighboring pixels in order to supplement reduction of the detection signals of each pixel of the two-dimensional sensor. That is, in a two-dimensional pixel array, pixel signals from pixels neighboring in a horizontal or vertical direction or in both horizontal and vertical directions are added. In the illustrated example, four pixel signals (=2×2) are added and are regarded as one pixel signal. Alternatively, the addition ratio (addition direction) may be appropriately set depending on a situation of the subject. For example, since a detection signal from a subject in a far distance is attenuated, the addition ratio is set to be higher.

Meanwhile, in the (b) high definition mode, the number of light emission pulses per unit time or the pulse amplitude of the light-emitting unit 11 increases in order to increase the emitted light intensity of the light source. As a result, a detection signal level per unit time from a pixel increases, and a signal-to-noise (S/N) ratio is improved. The addition ratio in pixel addition of the light-receiving unit 12 decreases to improve a resolution in two-dimensional directions. In the illustrated example, detection is performed in the unit of pixel (1×1). Alternatively, the pixel addition process may be performed by dividing the image into a plurality of areas depending on a subject position or the like and setting different addition ratios for each area.

In this manner, according to the first embodiment, the switching between two operation modes (including the power saving mode and the high definition mode) is implemented by combining the light emission pulse of the light-emitting unit 11 and the operation of the pixel addition process of the light-receiving unit 12. However, the combination may be appropriately changed without limiting thereto.

FIG. 5 is a diagram illustrating switching of the operation mode depending on a situation of the subject. A typical measurement operation is performed in the power saving mode as illustrated in FIG. 4(a), and the image processing unit 17 creates a distance image. That is, the power consumption of the light source is suppressed by weakening the emitted light intensity. When there is no detection target subject (for example, a person) in the distance image, the measurement is continuously performed in the power saving mode.

When there is a subject (person) as a detection target in the distance image, the measurement is performed by switching to the high definition mode of FIG. 4(b). That is, photographing is performed with high luminance by increasing the emitted light intensity. As a result, it is possible to detect a subject (person) with high definition in the event of detection while reducing power consumption during a normal time. Here, determination on presence of a subject (such as a person) may be performed using the differential image.

Note that, in some cases, the sensor of the light-receiving unit 12 is saturated during measurement in the high definition mode due to a close distance from the distance measurement apparatus 1 to the subject or due to high reflection on the subject. In this case, the mode is returned to the power saving mode. Alternatively, any one of the light emission pulse or the pixel addition process is returned to the operation of the power saving mode.

Figure 6:
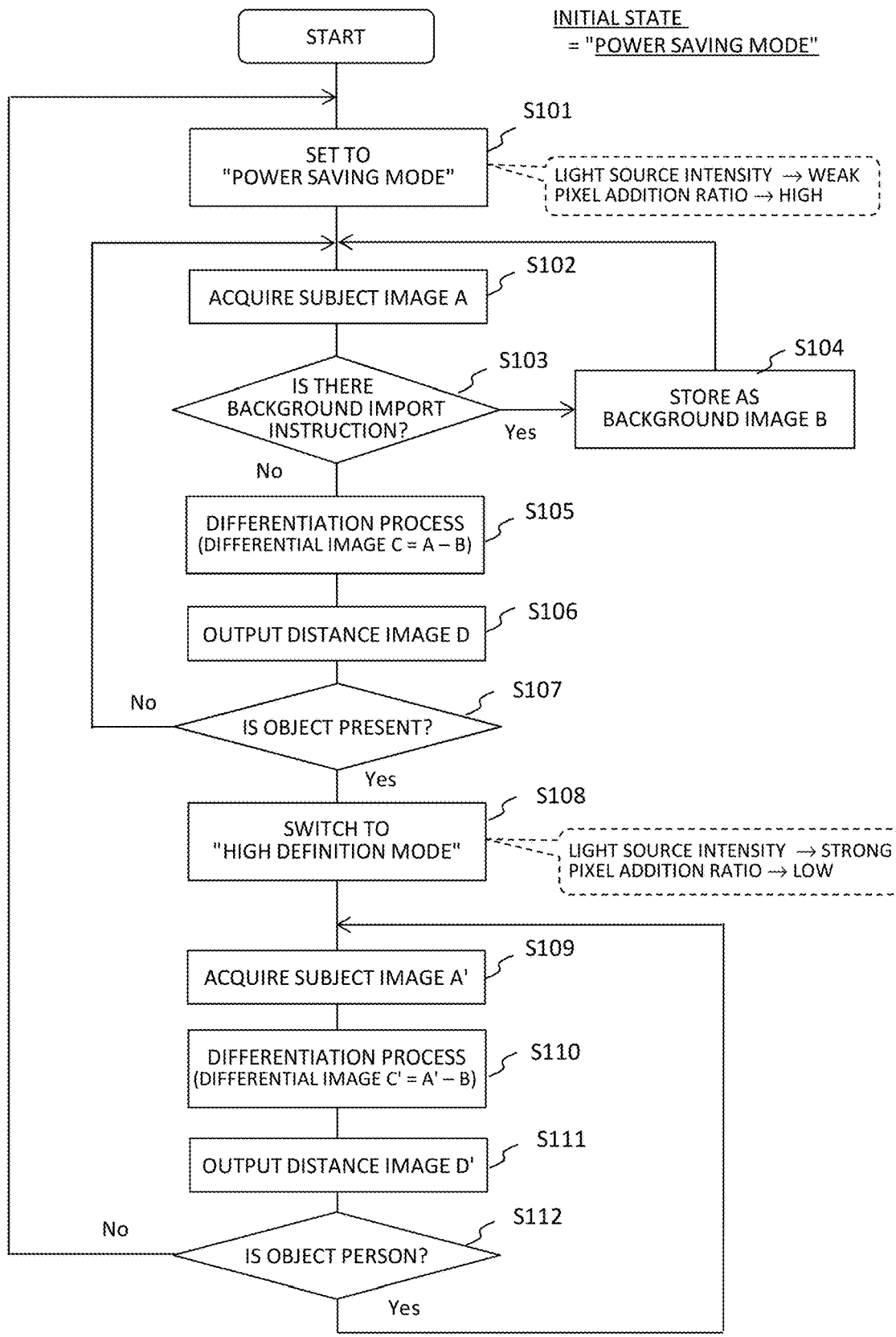
FIG. 6 is a flowchart illustrating a distance measurement flow.

FIG. 6 is a flowchart illustrating a distance measurement flow according to the first embodiment. In the following image processing, it is assumed that operations of each part of FIG. 1 are controlled by a central processing unit (CPU) of the distance measurement apparatus 1. The distance measurement will now be described step by step.

In S101, the operation mode of the initial state is set to the power saving mode. That is, the light emission intensity control unit 18 sets the emitted light intensity of the light-emitting unit 11 to "weak", and the pixel addition control unit 9 sets the pixel addition ratio of the light-receiving unit 12 to "high". In S102, a subject image A within a predetermined range is acquired by the TOF camera 10.

In S103, the background image import unit 14 determines whether or not a background image import instruction is received. The background image import instruction may be issued from a user's manipulation or automatically at a predetermined timing. For example, supposing that a movement of a customer in a shop is detected, the background image may be imported before opening of the shop. If there is an import instruction, the process advances to S104. If there is no instruction, the process advances to S105. In S104, the current subject image A is stored in the background image memory unit 15 as a background image B. Then, the process returns to S102, so that acquirement of a subject image A is repeated.

In S105, the differentiator 16 creates a differential image C by removing the background image B of the background image memory unit 15 from the subject image A of the TOF camera 10. In this case, a noise component contained in the subject image is also removed. In S106, the image processing unit 17 creates a distance image D by performing a colorization process or the like on the basis of the distance data of the differential image C and outputs the distance image D to an external device.

In S107, the image processing unit 17 determines whether or not there is an object in the distance image D (or the differential image C). If there is an object, the process advances to S108. If there is no object, the process returns to S102, so that acquirement of a subject image A is repeated. In S108, if there is an object, the operation mode is switched from the power saving mode to the high definition mode. That is, the light emission intensity control unit 18 sets the emitted light intensity of the light-emitting unit 11 to "strong", and the pixel addition control unit 19 sets the pixel addition ratio of the light-receiving unit 12 to "low". As a result, it is possible to facilitate determination on whether or not the object is a person in S112 described below.

In S109, a subject image A' is acquired by the TOF camera 10 in the high definition mode. In S110, a differential image C' is created by removing the background image B of the background image memory unit 15 from the subject image A' of the TOF camera 10 using the differentiator 16. Note that, if the number of pixels is different between the subject image A' and the background image B, the background image B is scaled up or down in order to set the same number of pixels as that of the subject image A'.

In S111, the image processing unit 17 creates a distance image D' by performing a colorization process or the like on the basis of the distance data of the differential image C' and outputs the distance image D' to an external device. In S112, the image processing unit 17 determines whether or not an object present in the distance image D' (or the differential image C') is a detection target person. In the determination on a person, an image recognition technique well known in the art may be employed. If the object is a person, the process returns to S109, so that acquirement of a subject image A' in the high definition mode is repeated. If the object is not a person, the process returns to S101, so that the operation mode is switched to the power saving mode, and acquirement of a subject image A is repeated.

Through the aforementioned flow, if there is a person as a detection target in the subject image, the measurement is performed in the high definition mode. If there is no person, the measurement is performed in the power saving mode. Note that, although the operation mode in the initial state is set to the power saving mode in FIG. 6, the operation mode may also start from the high definition mode.

Figure 7:
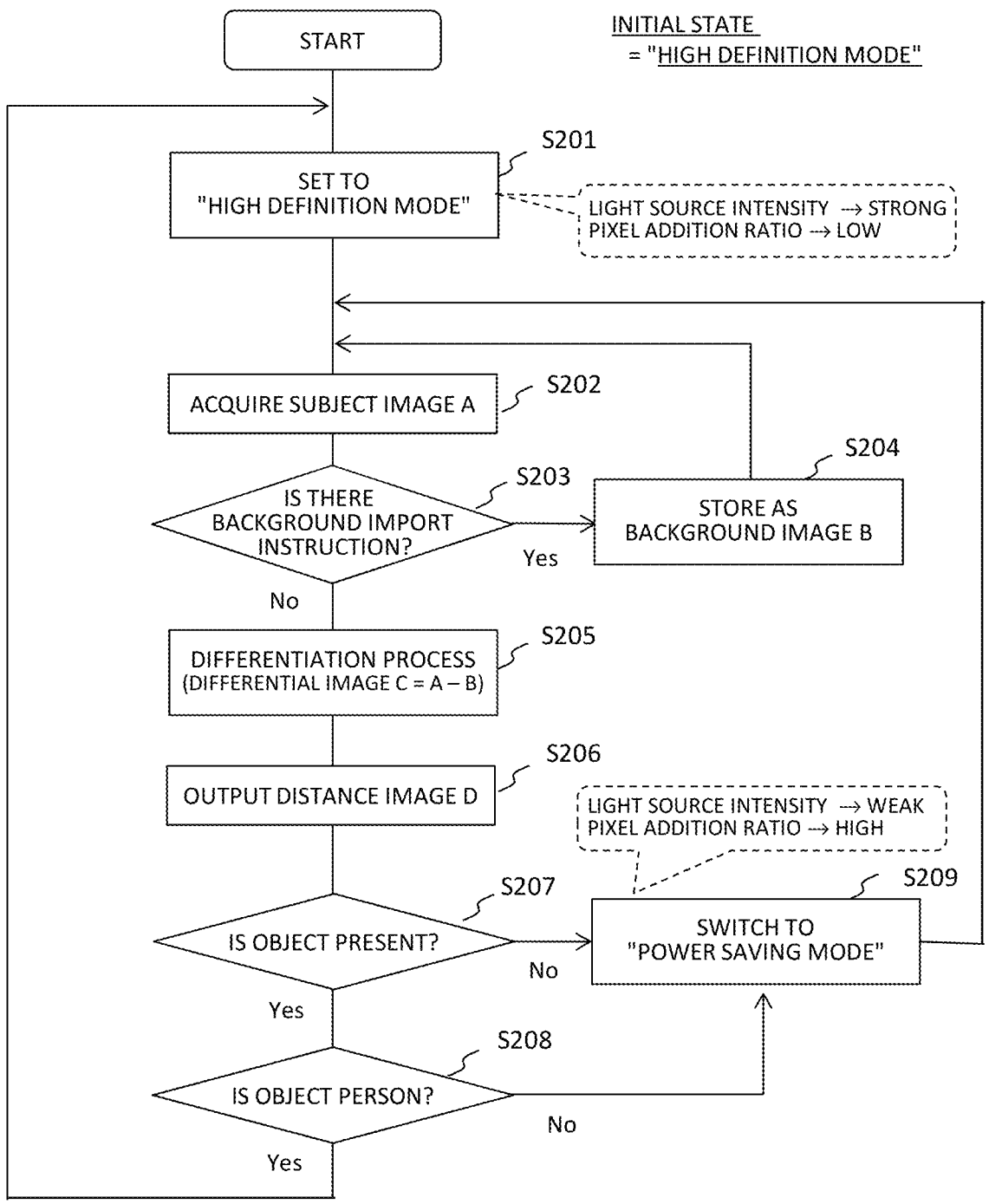
FIG. 7 is another flowchart illustrating the distance measurement flow.

FIG. 7 is another flowchart illustrating a distance measurement flow according to the first embodiment. In S201, the operation mode of the initial state is set to the high definition mode. That is, the light emission intensity control unit 18 sets the emitted light intensity of the light-emitting unit 11 to "strong", and the pixel addition control unit 19 sets the pixel addition ratio of the light-receiving unit 12 to "low". In S202, a subject image A within a predetermined range is acquired by the TOF camera 10.

In S203, the background image import unit 14 determines whether or not an import instruction of a background image is received. If there is an import instruction, the process advances to S204. If there is no instruction, the process advances to S205. In S204, the current subject image A is stored in the background image memory unit 15 as a background image B. Then, the process returns to S202, so that acquirement of a subject image A is repeated.

In S205, the differentiator 16 creates a differential image C by removing the background image B of the background image memory unit 15 from the subject image A of the TOF camera 10. Note that, if the number of pixels is different between the subject image A and the background image B, the background image B is scaled up or down in order to set the same number of pixels as that of the subject image A. In S206, the image processing unit 17 creates a distance image D by performing a colorization process or the like on the basis of the distance data of the differential image C and outputs the distance image D to an external device.

In S207, the image processing unit 17 determines whether or not there is an object in the distance image D (or the differential image C). If there is an object, the process advances to S208. If there is no object, the process advances to S209. In S208, the image processing unit 17 determines whether or not the object present in the distance image D (or the differential image C) is the detection target person. If the object is a person, the process returns to S201, so that acquirement of a subject image A in the high definition mode is repeated. If the object is not a person, the process advances to S209.

In S209, if there is no object in the distance image D (or the differential image C), or the object is not a person, the operation mode is switched from the high definition mode to the power saving mode. That is, the light emission intensity control unit 18 sets the emitted light intensity of the light-emitting unit 11 to "weak", and the pixel addition control unit 19 sets the pixel addition ratio of the light-receiving unit 12 to "high". Then, the process advances to S202, so that acquirement of a subject image A in the power saving mode is repeated.

Similarly, in this flow, if there is a detection target person in the subject image, the measurement is performed by setting the high definition mode. If there is no detection target person, the measurement is performed by setting the power saving mode.

According to the first embodiment, the operation mode is switched between the high definition mode and the power saving mode depending on a situation of a subject. Therefore, it is possible to provide a distance measurement apparatus capable of removing useless power consumption of the light source and securing necessary distance measurement performance.

Second Embodiment

In a second embodiment, a distance measurement system in which a plurality of distance measurement apparatuses are operated in cooperation will be described.

Figure 8:
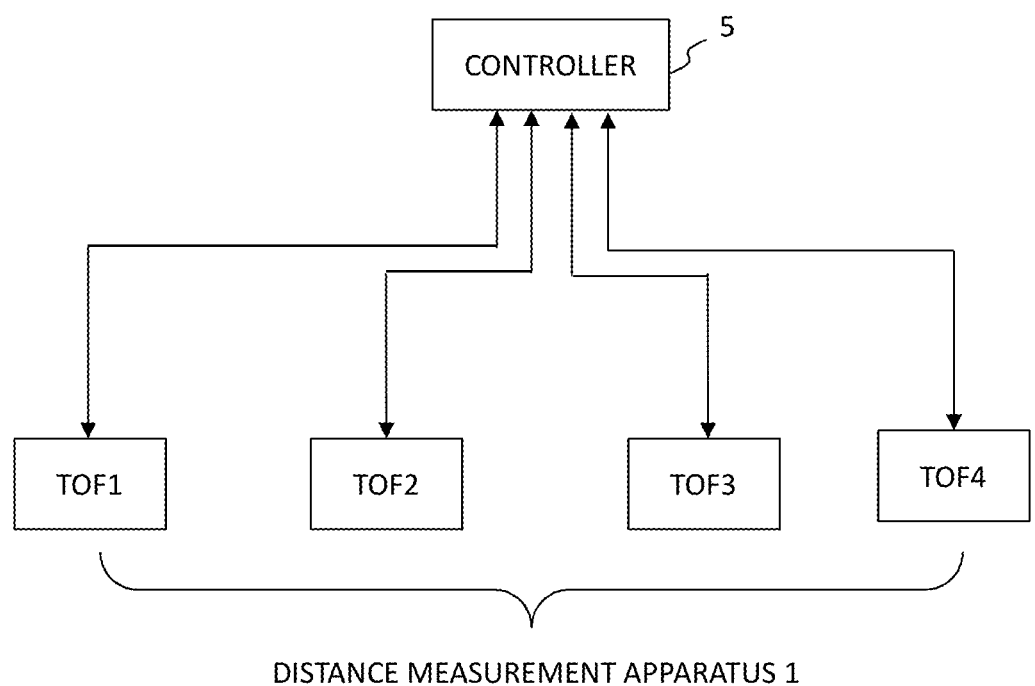
FIG. 8 is a block diagram illustrating a distance measurement system according to a second embodiment.

FIG. 8 is a block diagram illustrating a distance measurement system 6 according to the second embodiment. Here, it is assumed that four distance measurement apparatuses 1 (including TOF1 to TOF4) are connected to a controller 5 such as a personal computer (PC). As described above in the first embodiment, each distance measurement apparatus can switch the operation mode between the power saving mode and the high definition mode. The controller 5 receives the distance image created by each distance measurement apparatus 1 (TOF1 to TOF4) and instructs switching of the operation mode to each distance measurement apparatus. For example, the controller 5 switches the operation modes of each distance measurement apparatus depending on installation positions of each distance measurement apparatus or a situation of a subject detected by each distance measurement apparatus. Therefore, it is possible to perform measurement with high efficiency while suppressing power consumption of the distance measurement system 6 as a whole.

FIG. 9 is a diagram illustrating an example of the distance measurement system of FIG. 8 applied to a shop. In this example, four distance measurement apparatuses (TOF1 to TOF4) are installed in four corners of a shop 7, and the controller 5 controls each distance measurement apparatus. The distance measurement apparatus TOF1 is installed in the vicinity of an entrance, and the distance measurement apparatus TOF4 is installed in the vicinity of a cash desk. In this example, the controller 5 performs the following control in order to efficiently detect a person (customer) in the shop 7.

(1) If only the distance measurement apparatus TOF1 installed in the entrance detects a person, only the distance measurement apparatus TOF1 is set to the high definition mode, and other distance measurement apparatuses are set to the power saving mode. (2) If the distance measurement apparatus TOF1 of the entrance detects a person, all of the distance measurement apparatuses TOF1 to TOF4 advance to the high definition mode. (3) If the distance measurement apparatus TOF1 detects a person, the distance measurement apparatus TOF1 advances to the high definition mode, and the distance measurement apparatuses TOF2 and TOF4 having detection target ranges set to an adjacent path along which the person is expected to move advance to the high definition mode.

(4) Since the distance measurement apparatuses TOF1 and TOF2 are close to the entrance, they are susceptible to ambient light such as sunlight or a car headlight. Therefore, the distance measurement apparatuses TOF1 and TOF2 are set to the high definition mode at all times. (5) Since a clerk highly probably resides in the cash desk close to the distance measurement apparatus TOF4, and a customer stands by in front of the cash desk, the distance measurement apparatus TOF4 is set to the high definition mode at all times. (6) Since the distance measurement apparatus TOF3 installed in the deepest side has the lowest person detection frequency, an inexpensive light source having a shorter service lifetime is employed.

In this manner, according to the second embodiment, in the case of the distance measurement system having a plurality of distance measurement apparatuses, the operation modes of each distance measurement apparatus are switched depending on installation positions of each distance measurement apparatus or a situation of a subject detected by each distance measurement apparatus. Therefore, it is possible to perform efficient measurement while suppressing power consumption of the system as a whole.

In the aforementioned embodiments, it is assumed that a person as a subject is set as a detection target. However, this may also apply to a case where an object other than a person is set as a detection target.

What is claimed is:

1. A distance measurement apparatus that measures a distance to a subject to output a distance image, comprising:
   a distance measurement unit having a light-emitting unit, a light-receiving unit, and a distance-calculating unit to measure a distance to the subject on the basis of light transmission time;
   an image processing unit that creates a distance image of the subject from distance data measured by the distance measurement unit;
   a light emission intensity control unit that controls an emitted light intensity from a light source of the light-emitting unit; and
   a pixel addition control unit that controls an addition process for a pixel signal from a neighboring pixel in the light-receiving unit,
   wherein the image processing unit determines whether or not there is a detection target in the created distance image,
   a high definition mode, in which the light emission intensity control unit increases the emitted light intensity of the light-emitting unit, and the pixel addition control unit decreases an addition ratio of the neighboring pixel signal of the light-receiving unit, is set if there is the detection target in the distance image, and
   a power saving mode, in which the light emission intensity control unit decreases the emitted light intensity of the light-emitting unit, and the pixel addition control unit increases the addition ratio of the neighboring pixel signal of the light-receiving unit, is set if there is no detection target in the distance image.

2. The distance measurement apparatus according to claim 1, wherein the light emission intensity control unit changes the number of light emission pulses per unit time or a pulse amplitude to control the emitted light intensity from the light source.

3. The distance measurement apparatus according to claim 1, wherein the pixel addition control unit changes an addition ratio of pixel signal(s) neighboring in a horizontal or vertical direction or in both horizontal and vertical directions in a two-dimensional pixel array when the pixel addition control unit controls an addition process of the neighboring pixel signal.

4. The distance measurement apparatus according to claim 1, wherein the operation mode is switched from the high definition mode to the power saving mode if it is detected that the detection target is near the distance measurement apparatus, or the pixel signal of the light-receiving unit is saturated due to high reflection on the detection target, even when there is the detection target in the distance image as a result of the determination of the image processing unit.

5. A distance measurement system having a plurality of distance measurement apparatuses connected to a controller to create a distance image of a subject,
   each of the distance measurement apparatuses having
   a distance measurement unit having a light-emitting unit, a light-receiving unit, and a distance-calculating unit to measure a distance to the subject on the basis of light transmission time;
   an image processing unit that creates a distance image of the subject from distance data measured by the distance measurement unit;
   a light emission intensity control unit that controls an emitted light intensity from a light source of the light-emitting unit; and
   a pixel addition control unit that controls an addition process for a pixel signal from a neighboring pixel in the light-receiving unit,
   wherein the plurality of distance measurement apparatuses have operation modes switchable between a high definition mode in which the light emission intensity control unit increases the emitted light intensity of the light-emitting unit, and the pixel addition control unit decreases an addition ratio of the neighboring pixel signal of the light-receiving unit, and a power saving mode in which the light emission intensity control unit decreases the emitted light intensity of the light-emitting unit, and the pixel addition control unit increases the addition ratio of the neighboring pixel signal of the light-receiving unit, and
   the controller instructs each of the distance measurement apparatuses to switch the operation mode in cooperation depending on an installation position of each of the distance measurement apparatuses or a distance image of the subject created by each of the distance measurement apparatuses.

6. The distance measurement system according to claim 5, wherein, if there is a detection target in a distance image created by a particular distance measurement apparatus provided in a particular position out of the plurality of distance measurement apparatuses, the controller instructs all of the distance measurement apparatuses including the particular distance measurement apparatus to switch to the high definition mode.

7. The distance measurement system according to claim 5, wherein, if there is a detection target in a distance image created by one of the plurality of distance measurement apparatuses, the controller instructs at least one of the other distance measurement apparatuses having a detection target range including an adjacent path along which the detection target is expected to move to switch to the high definition mode in association with the one distance measurement apparatus.

* * * * *